United States Patent
Yuan et al.

(10) Patent No.: US 10,972,724 B2
(45) Date of Patent: Apr. 6, 2021

(54) METHOD, CONTROLLER, AND SYSTEM FOR ENCODING A SEQUENCE OF VIDEO FRAMES

(71) Applicant: Axis AB, Lund (SE)

(72) Inventors: Song Yuan, Lund (SE); Alexander Toresson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/425,569

(22) Filed: May 29, 2019

(65) Prior Publication Data
US 2019/0373256 A1 Dec. 5, 2019

(30) Foreign Application Priority Data

Jun. 5, 2018 (EP) .................................. 18175973

(51) Int. Cl.
*H04N 19/159* (2014.01)
*H04N 19/172* (2014.01)
*H04N 19/107* (2014.01)
*H04N 5/232* (2006.01)

(52) U.S. Cl.
CPC ....... *H04N 19/107* (2014.11); *H04N 5/23258* (2013.01); *H04N 19/159* (2014.11); *H04N 19/172* (2014.11)

(58) Field of Classification Search
CPC .................... H04N 7/232; H04N 19/00769
USPC .................................. 375/240.1–240.29
See application file for complete search history.

(56) References Cited

U.S. PATENT DOCUMENTS

| | | | |
|---|---|---|---|
| 10,469,866 B2* | 11/2019 | Park | H04N 19/597 |
| 2009/0154562 A1* | 6/2009 | Syed | H04N 11/26 375/240.16 |
| 2011/0206344 A1* | 8/2011 | Simpson | H04N 21/4307 386/230 |
| 2013/0003845 A1* | 1/2013 | Zhou | H04N 19/61 375/240.16 |
| 2013/0287093 A1* | 10/2013 | Hannuksela | H04N 19/30 375/240.02 |
| 2013/0308002 A1* | 11/2013 | Jiang | H04N 5/23222 348/208.6 |
| 2014/0051921 A1* | 2/2014 | Miller | H04N 21/2662 600/103 |
| 2014/0064386 A1* | 3/2014 | Chen | H04N 19/187 375/240.29 |

(Continued)

FOREIGN PATENT DOCUMENTS

EP 3029936 A1 6/2016

OTHER PUBLICATIONS

Extended European Search Report dated Jul. 26, 2018 for the European Patent Application No. 18175973.9.

*Primary Examiner* — Irfan Habib
(74) *Attorney, Agent, or Firm* — Volpe Koenig

(57) ABSTRACT

A method, a controller, and a system for encoding a sequence of video frames captured by a camera mounted to a moving object. The method comprises receiving input indicating an amount of movement of the camera, receiving input regarding a predetermined distance, and selecting between intra-coding and inter-coding of the video frames of the sequence based on the amount of movement of the camera and the predetermined distance, such that the camera moves at most the predetermined distance between capturing video frames which are intra-coded.

12 Claims, 4 Drawing Sheets

(56) References Cited

U.S. PATENT DOCUMENTS

| | | | |
|---|---|---|---|
| 2014/0133548 A1 | 5/2014 | Mate et al. | |
| 2014/0198851 A1* | 7/2014 | Zhao | H04N 7/15 375/240.16 |
| 2014/0254679 A1* | 9/2014 | Ramasubramonian | H04N 19/577 375/240.15 |
| 2015/0254852 A1* | 9/2015 | Yamato | A61B 6/5288 345/634 |
| 2015/0335949 A1* | 11/2015 | Lokshin | G06K 9/00342 700/91 |
| 2016/0007158 A1* | 1/2016 | Venkatraman | H04M 1/72457 455/456.2 |
| 2016/0021332 A1* | 1/2016 | Hines | H04N 19/00 386/201 |
| 2016/0165261 A1* | 6/2016 | Nystrom | H04N 19/593 348/155 |
| 2017/0054890 A1* | 2/2017 | Wilt | H04N 5/2353 |
| 2017/0064338 A1 | 3/2017 | Martins et al. | |
| 2017/0187961 A1* | 6/2017 | Katz | H04N 5/23267 |
| 2017/0359549 A1* | 12/2017 | Baran | H04N 5/3532 |

* cited by examiner

METHOD, CONTROLLER, AND SYSTEM FOR ENCODING A SEQUENCE OF VIDEO FRAMES

FIELD OF INVENTION

The present teachings relate to the field of video encoding. In particular it relates to a method and associated devices for encoding a sequence of video frames captured by a camera mounted to a moving object.

BACKGROUND

The use of video cameras for monitoring and surveillance purposes is increasing. This applies especially to cameras mounted on moving objects, such as body-worn cameras or cameras used on trains or buses. Body-worn cameras may be used by police or security staff, and the video captured by the camera may be used for forensic purposes. In order for the video to serve as evidence, it is important that the quality of the video is high enough, regardless of how the person wearing the camera moves. As many video encoding methods are adapted and optimized for stationary cameras, there is a need for improvements.

SUMMARY

In view of the above, it is thus an object of the present teachings to improve the encoding of a sequence of video frames captured by a camera mounted to a moving object. In particular, it is an object to adapt the encoding to the motion of the object so as to ensure a certain quality of the video regardless of the motion of the moving object.

According to a first aspect, the above object is achieved by a method of encoding a sequence of video frames captured by a camera mounted to a moving object comprising: receiving input indicating an amount of movement of the camera; receiving input regarding a predetermined distance; and selecting between intra-coding and inter-coding of the video frames of the sequence based on the amount of movement of the camera and the predetermined distance, such that the camera moves at most the predetermined distance between capturing video frames which are intra-coded.

By a sequence of video frames is meant a temporal sequence of image frames each carrying image data. Video frames may generally be intra-coded or inter-coded. An intra-coded frame is self-contained in that it is encoded without making reference to any other frame. Accordingly, and intra-coded frame may be decoded without having access to any other frame. This is in contrast to inter-coded frames which are encoded with reference to one or more other frames. In that way, the inter-coded frames may typically be encoded at a lower bit cost than the intra-coded frames. However, the lower bit cost of the inter-coded frames come at the cost of lower quality. In other words, the intra-coded frames typically have the advantage that they will be of higher quality, and thus have a higher forensic value, than the inter-coded frames.

For a stationary camera, it may make sense to distribute the intra-coded frames evenly over time to ensure that the video quality remains at a certain level. However, this does not make sense in the same way for cameras attached to moving objects. To see that this is the case, consider a camera which is mounted to a moving object and for which intra-frames are encoded at a certain temporal rate. As the object moves at a first speed, the temporal rate translates into a first spatial rate. For example, one frame may be intra-coded per meter travelled by the object. If the object instead moves at a second, higher, speed, the temporal rate translates into a second, lower, spatial rate. For example, one frame may be intra-coded per ten meters travelled by the object. In the first case, one high-quality frame is encoded per meter moved by the object, and in the second case, one high-quality frame is encoded per ten meters moved by the object. Accordingly, having an intra-coding rate which is set per time unit causes the quality of the video per distance unit to go down as the object moves faster. To have a constant quality of the video for moving objects, it would instead make more sense to have a rate of intra-coded frames which is set per distance unit travelled by the object rather than per time unit. This is achieved by selecting intra-coding and inter-coding of the video frames of the sequence based on the amount of movement of the camera and the predetermined distance in such a way that the camera moves at most the predetermined distance between capturing video frames which are intra-coded.

This may also be advantageous for the purpose of performing a quick search in the encoded video. Such quick searching typically allows scanning through the encoded video for intra-coded frames. The intra-coded frames may then be decoded and shown in sequence. Since the intra-coded frames are self-contained, no other frames in the video needs to be decoded in order to decode the intra-coded frames. By distributing intra-coded frames in the video sequence such that the camera moves at most the predetermined distance in between capturing the intra-coded frames, video frames giving a good coverage of the full motion of the camera will be available in the quick search.

The moving object may, for example, be a person or a vehicle.

By intra-coding of a video frame is meant that the frame is encoded independently of all other frames in the video sequence. In particular, an intra-coded video frame is encoded without making reference to another video frame in the video sequence. An intra-coded frame is sometimes referred to as an I-frame, for example in the H.264 and H.265 standards.

By inter-coding of a video frame is meant that the frame is encoded to be dependent on other frames in the video sequence. In particular, an inter-coded video frame may be encoded by making reference to a previously decoded video frame in the video sequence. An inter-coded frame is sometimes referred to as a B- or P-frame in the H.264 and H.265 standards.

By an input indicating an amount of movement of the camera is generally meant information which is indicative of the movement of the camera as a function of time. In particular, the input indicating an amount of movement may be any information which allows the distance travelled by the camera since a fixed point in time to be derived. The input may, for instance, indicate the velocity of the camera as a function of time, or the position of the camera as a function of time.

When a frame is to be encoded, the encoder selects between intra-coding or inter-coding of the frame. The selection may be made in accordance with a parameter which governs the temporal rate at which intra-coded frames are selected. The temporal rate may be repeatedly adjusted based on the amount of movement of the camera and the predetermined distance, such that the camera in the end moves at most the predetermined distance between capturing video frames which are intra-coded. The temporal rate may be related to a length of a group of pictures, GOP, structure specifying the order in which the frames are intra-coded or inter-coded. Adjusting the temporal rate hence corresponds to adjusting the length of the GOP structure. The step of selecting between intra-coding and inter-coding of the video frames of the sequence based on the amount of movement of the camera and the predetermined distance may hence include setting a rate at which the video frames are encoded as intra-coded frames. In this way, the temporal rate which is set per time unit may be adjusted into a rate of intra-coded frames which is set per distance unit.

Changing the temporal rate at which frames are intra-coded is one example of how the GOP structure may be changed based on the amount of movement of the camera. For a GOP structure of the form IPPP . . . , where I denotes an I-frame and P a P-frame, the length of the GOP structure is the only parameter of the GOP structure that can be changed. For more advanced types of GOP structures, there are further parameters of the GOP structure that may be changed based on the amount of movement of the camera. The further parameters may be changed as an alternative to the length of the GOP structure, or in addition to the length of the GOP structure. For example, for a GOP structure of the form IBBPBBPBBPBBI, where B denotes a B-frame, the number of B-frames between I/P-frames is a further parameter of the GOP structure that may be changed depending on the amount of movement of the camera.

In order to arrive at a rate of intra-coded frames which is set per distance unit, the step of selecting between intra-coding and inter-coding of the video frames of the sequence may include: calculating, based on the input indicating an amount of movement of the camera, a distance that the camera has moved since it last captured a video frame which was intra-coded, and selecting between intra-coding and inter-coding of a current or a previous video frame based on a comparison between the calculated distance and the predetermined distance. Accordingly, when the selection between intra-coding and inter-coding is to be made, it may be checked how far the object has moved since the last intra-coded frame was encoded. This may then be compared with the predetermined distance to see whether it is time to encode an intra-coded frame or not.

In more detail, the current video frame may be selected to be intra-coded if the calculated distance is closer than a threshold value to the predetermined distance, and the current video frame may be selected to be inter-coded if the calculated distance is further than the threshold value from the predetermined distance. Thus, if the calculated distance is still far from the predetermined distance (as measured in terms of the threshold value), the current frame may be inter-coded. However, if the calculated distance is approaching the predetermined distance (closer than the threshold value to the predetermined distance), the video frame is better intra-coded to ensure that the camera does not move further than the predetermined distance between intra-coded frames.

The threshold value is preferably set so that it corresponds to, or is larger than, the distance travelled by the camera between capturing two subsequent frames for which the selection step is carried out. In that way, the camera will in the end move at most the predetermined distance between capturing video frames which are intra-coded. For example, the threshold value may be set such that it corresponds to, or is larger than, the distance travelled by the camera between capturing the current frame and the next frame for which the selection step is carried out. As the object has a variable speed, the threshold value is preferably adapted to the present movement of the camera. In more detail, the threshold value may depend on at least one of the amount of movement of the camera and a rate at which the step of selecting between intra-coding and inter-coding of the video frames of the sequence based on the amount of movement of the camera and the predetermined distance is repeated. By way of example, a current threshold value may be calculated as the product of a current velocity of the object and a repetition period of the selection step.

The input indicating an amount of movement of the camera is preferably on a form which allows calculation of the distance travelled by the camera since capturing the last intra-coded frame. For example, the input indicating an amount of movement of the camera may include at least one of a velocity of the camera and a position of the camera at a specified time. As input indicating an amount of movement of the camera is received repeatedly over time, the input may hence indicate at least one of the velocity of the camera as a function of time, or the position of the camera as a function of time.

The input indicating an amount of movement of the camera may be received from one or more of an accelerometer, a gyroscope, or a positioning device included in the camera or worn by the moving object. The positioning device may be a global positioning system, GPS, device or an equivalent thereof. It may also be a telecommunications modem from which the position may be derived based on triangulation techniques.

The step of selecting between intra-coding and inter-coding of the video frames of the sequence based on the amount of movement of the camera and the predetermined distance may be repeated for each video frame in the sequence. In other words, the rate at which the step of selecting is repeated may correspond to the frame rate of the video sequence.

However, in order to save processing power, the step of selecting may be carried out more seldom. The purpose of the selecting step is to ensure that the camera moves at most the predetermined distance between capturing video frames which are intra-coded. In many cases, the object can only move with a limited velocity resulting in that the object cannot possibly move the predetermined distance between two consecutive frames of the video sequence. In such cases, it is enough to repeat the selecting step at a lower rate. More specifically, the step of selecting between intra-coding and inter-coding of the video frames of the sequence based on the amount of movement of the camera and the predetermined distance may be repeated at a rate which is set depending on a maximum velocity of the moving object. The repetition period of the selecting step may be chosen such that the product of the maximum velocity of the moving object and the repetition period of the selecting step is shorter than the predetermined distance.

The video may be stored locally in the camera. For this purpose, the camera may have a video storage capacity. The video storage capacity is typically limited and should last for a specific amount of time. For example, the video storage capacity should last for storing video captured by the camera for one day. The video storage capacity together with the specific amount of time for which it should last define a bit budget. From the bit budget it is possible to derive how many bits that on average may be spent per time unit.

The value of the predetermined distance affects the number of bits in the encoded video. For a given velocity of the object, a shorter predetermined distance means that intra-coded frames are encoded more frequently, thereby leading to a higher number of bits in the encoded video compared to if the predetermined distance had been longer. Moreover, as the velocity of the object increases, it takes less time for the object to travel the predetermined distance. Hence the frequency of the intra-coded frames, and thereby the bit cost, increases with the velocity of the object.

In order to deal with the limited video storage capacity, the predetermined distance may have to be adjusted over time. Otherwise, there is a risk that the bit budget is exceeded. Specifically, the method may further comprise adjusting the predetermined distance based on at least one of a current usage of the video storage capacity of the camera and the amount of movement of the camera. For example, if the current usage of the video storage capacity exceeds the average number of bits that may be spent up until the current point of time according to the bit budget, the predetermined distance may be increased, and vice versa. According to another example, the predetermined distance may be increased if the amount of movement of the camera has exceeded a certain level for a certain amount of time, and vice versa.

The predetermined distance may be adjusted within a range. For example, the predetermined distance may be adjusted within a range which is set depending on the video storage capacity in the camera and historical data reflecting a movement pattern of the moving object. In this way, the predetermined distance is bound to be within a certain range which is selected having the limited video storage capacity in the camera and the typical movement pattern of the moving object in mind. This decreases the risk of exceeding the bit budget in the end. A first object may according to historical data move more on average than a second object. The lower end of the range may therefore be set to be higher (i.e., the range may be shifted towards longer distances) for the first object than for the second object. In this way, the risk that the first object exceeds the bit budget decreases.

According to a second aspect, there is provided a controller for controlling a video encoder to encode a sequence of video frames captured by a camera mounted to a moving object comprising: a receiver configured to receive input indicating an amount of movement of the camera and input regarding a predetermined distance; and a control component configured to control the video encoder to select between intra-coding and inter-coding of the video frames of the sequence based on the amount of movement of the camera and the predetermined distance, such that the camera moves at most the predetermined distance between capturing video frames which are intra-coded.

According to a third aspect, there is provided a system comprising: a video camera arranged to be mounted on a moving object and to capture a sequence of video frames; a motion measurement device configured to measure an amount of movement of the video camera; a video encoder for encoding the sequence of video frames captured by the video camera; and a controller according to the second aspect for controlling the video encoder.

According to a fourth aspect, there is provided a computer program product comprising a non-transitory computer-readable medium having stored thereon computer code instructions adapted to carry out the method of the first aspect when executed by a device having processing capability.

The second, third, and fourth aspects may generally have the same features and advantages as the first aspect. It is further noted that the present teachings relate to all possible combinations of features unless explicitly stated otherwise.

BRIEF DESCRIPTION OF THE DRAWINGS

The above, as well as additional objects, features and advantages of the present teachings, will be better understood through the following illustrative and non-limiting detailed description of embodiments of the present teachings, with reference to the appended drawings, where the same reference numerals will be used for similar elements, wherein.

DETAILED DESCRIPTION

The present teachings will now be described more fully hereinafter with reference to the accompanying drawings, in which embodiments are shown. The present teachings may, however, be embodied in many different forms and should not be construed as limited to the embodiments set forth herein; rather, these embodiments are provided for thoroughness and completeness, and to fully convey the scope of the present teachings to the skilled person. The systems and devices disclosed herein will be described during operation.

Figure 1:
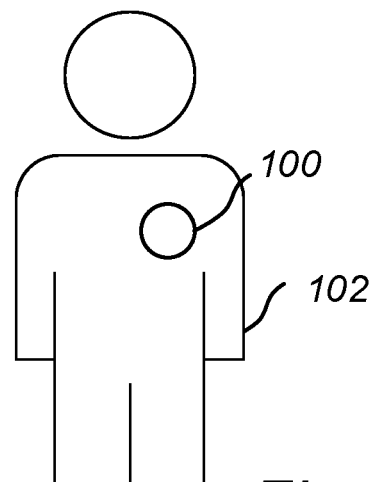
FIG. 1 illustrates a system for encoding a sequence of video frames captured by a camera mounted to a moving object according to embodiments.

FIG. 1 illustrates a system 100 which is mounted to a moving object 102. The moving object 102 may generally be any moving object, such as a person or a vehicle.

Figure 2:
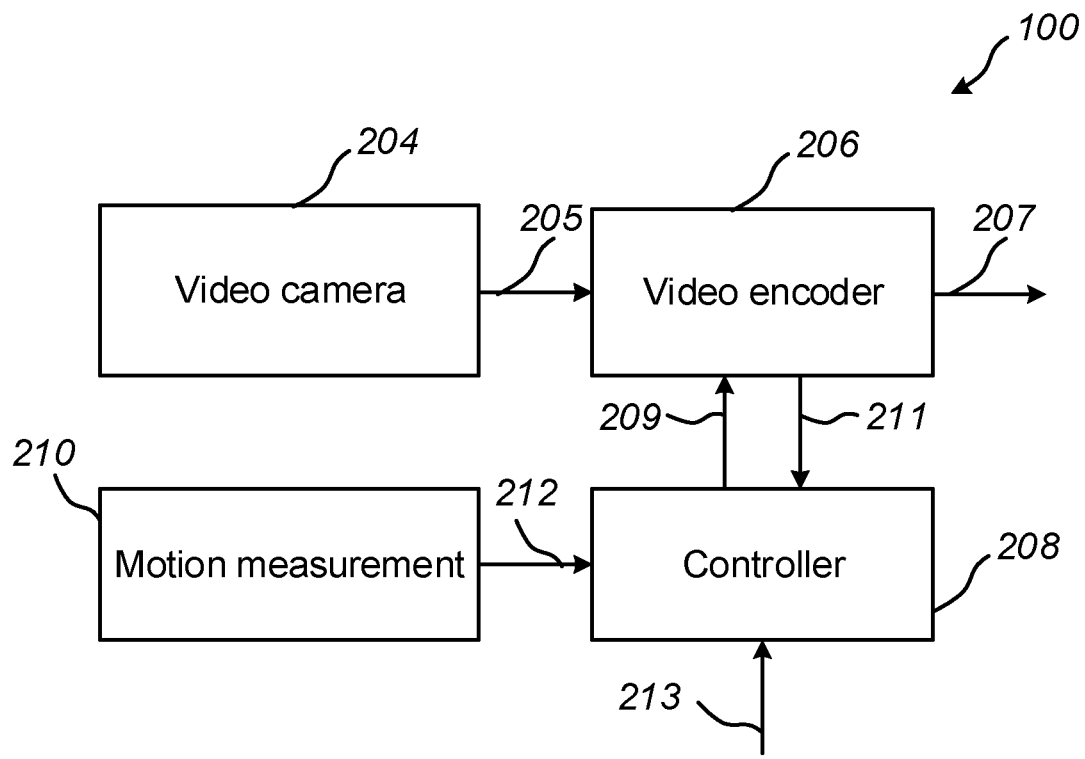
FIG. 2 schematically illustrates the system shown in FIG. 1 in more detail.

The system 100 is illustrated in more detail in FIG. 2. The system comprises a video camera 204, a video encoder 206, a controller 208, and a motion measurement device 210.

The video camera 204 is arranged to be mounted to the moving object 100. The video camera 204 captures a sequence of video frames 205 at a certain frame rate. Each video frame hence includes image data corresponding to a certain point in time. When the video camera 204 is mounted to the moving object, the captured sequence of video frames 205 depicts the surroundings of the moving object 100.

The video camera 204 is operably connected to the video encoder 206. The video encoder 206 may be included in the video camera 204, or may be provided as a separate unit. The video encoder 206 is arranged to receive the sequence of video frames 205 from the video camera 204, and to encode the sequence of video frames 205 to provide an encoded sequence of video frames 207. The video camera 204 may encode the video frames 205 in accordance with a GOP structure, which specifies the order of intra-coded and inter-coded frames. The encoded sequence of video frames 207 may be stored in a video storage, that is, a memory, of the system. For example, the video storage may be included in the video camera 204.

The controller 208 is arranged to control the operation of the video encoder 206. The controller may be provided as an integral part of the video encoder 206 or as a separate unit. The controller 208 may control the operation of the video encoder 208 by sending a control signal 209. The control signal 209 may include an instruction to the video encoder 206 whether to intra-code or inter-code a video frame of the sequence 205. For example, the control signal 209 may include an instruction to change the GOP structure. In particular, the control signal 209 may include an instruction to change the length of the GOP structure. The controller 208 may also receive feedback 211 from the video encoder 206. The feedback 211 may relate to whether a video frame of the video sequence 205 was intra-coded or inter-coded.

The motion measurement device 210 is arranged to measure a movement of the video camera 204. The motion measurement device 210 may be attached to the video camera 204 or to the moving object 102 to which the camera 204 is mounted. The motion measurement device 210 may generally be any device delivering a signal from which the movement of the video camera 204 may be derived. This includes devices which measures the velocity of the video camera 204, such as an accelerometer or a gyroscope. The motion measurement device 210 may alternatively, or additionally, include a positioning device which measures the position of the video camera 204 at specified points in time. The positioning device may be a global positioning system, GPS, device or an equivalent thereof. It may also be a telecommunications modem from which the position may be derived based on triangulation techniques. The motion measurement device 210 may even be a step counter.

The motion measurement device 210 provides input 212 indicative of the amount of movement of the camera 204 to the controller 208. Additionally, the controller 208 is arranged to receive input 213 regarding a predetermined distance. The predetermined distance input 213 may, for instance, be provided by a user or an operator upon configuration of the controller 218.

Figure 3:
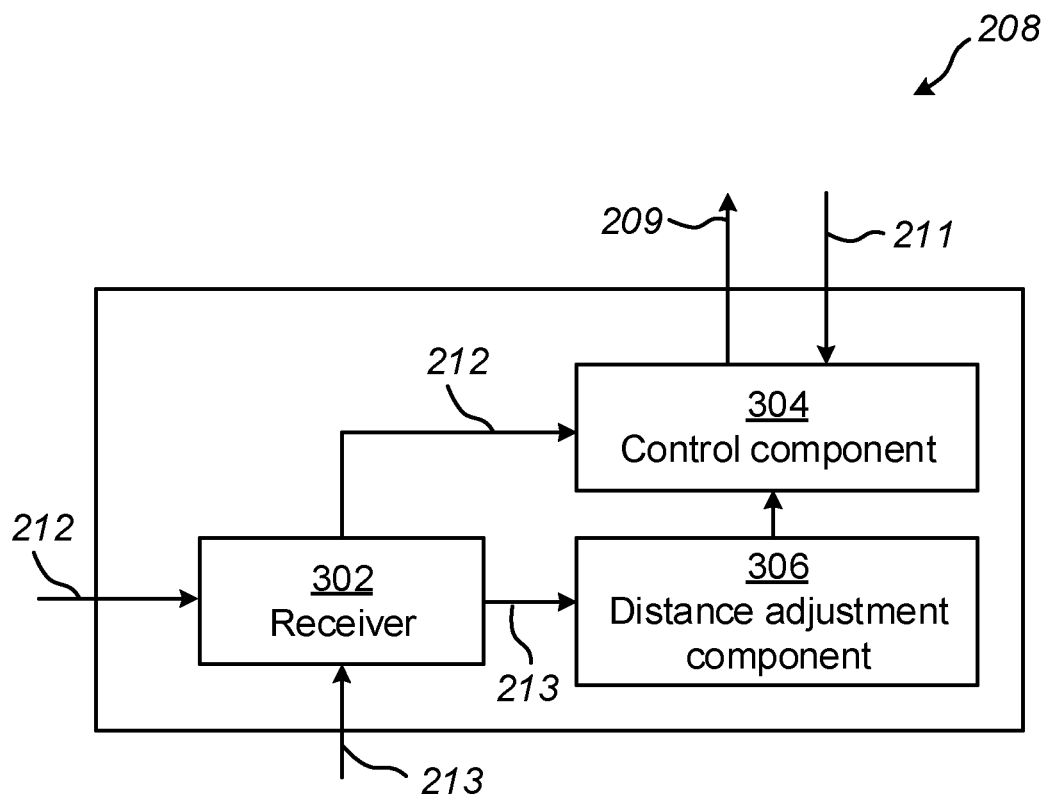
FIG. 3 schematically illustrates a controller for controlling a video encoder to encode a sequence of video frames captured by a camera mounted to a moving object according to embodiments.

FIG. 3 illustrates the controller 208 in more detail. The controller 208 includes a receiver 302, and a control component 304. The controller 208 may also in some embodiments include a distance adjustment component 306.

The controller 208 thus comprises various components 302, 304, 306 which are configured to implement the functionality of the controller 208. In particular, each illustrated component corresponds to a functionality of the controller 208. Generally, the controller 208 may comprise circuitry which is configured to implement the components 302, 304, 306 and, more specifically, their functionality.

In a hardware implementation, each of the components 302, 304, 306 may correspond to circuitry which is dedicated and specifically designed to provide the functionality of the component. The circuitry may be in the form of one or more integrated circuits, such as one or more application specific integrated circuits. By way of example, the control component 304 may thus comprise circuitry which, when in use, controls the video encoder 206 to select between intra-coding and inter-coding of the video frames in the sequence 205.

In a software implementation, the circuitry may instead be in the form of a processor, such as a microprocessor, which in association with computer code instructions stored on a (non-transitory) computer-readable medium, such as a non-volatile memory, causes the controller 208 to carry out any method disclosed herein. In that case, the components 302, 304, 306 may thus each correspond to a portion of computer code instructions stored on the computer-readable medium, that, when executed by the processor, causes the controller 208 to carry out the functionality of the component.

It is to be understood that it is also possible to have a combination of a hardware and a software implementation, meaning that the functionality of some of the components 302, 304, 306 are implemented in hardware and others in software.

The operation of the system 100, and in particular the controller 208, will now be described with reference to FIGS. 2, 3, 4, 5, and the flowchart of FIG. 6.

In step S02, the receiver 302 of controller 208 receives input 212 indicating an amount of movement of the video camera 204. As previously described, the input 212 may be received from the motion measurement device 210. The input 212 may concern a velocity of the camera 204 and/or a position of the camera 204 at specified points in time. It is to be understood that the receiver 302 continuously, or at least repeatedly, receives such input from the motion measurement device 210. The received input 212 hence reflects the amount of motion of the video camera 204 as a function of time.

In step S04, the receiver 302 of controller 208 receives input 213 regarding a predetermined distance. The predetermined distance refers to a predetermined spatial distance.

The receiver 302 forwards the input 212, indicating an amount of movement of the video camera 204, and the input 213, regarding a predetermined distance, to the control component 304. As will described in more detail below, the input 213 regarding a predetermined distance may in some embodiments be adjusted by the distance adjustment component 306 prior to being forwarded to the control component 304.

In step S06, the control component 304 of the controller 208 controls the video encoder 206 to select between intra-coding and inter-coding of the video frames of the sequence based on the input 212 indicating an amount of movement of the video camera 204 and the input 213 regarding a predetermined distance. In more detail, the control component 304 may select on basis of the input 212 and the input 213 whether the video frames should be intra-coded or inter-coded. The control component 304 may send a control signal 209 to inform the video encoder 206 of the selection, and the video encoder 206 may encode the image data of the video frames accordingly. The information sent to the video encoder 206 in the control signal 209 may relate to a rate at which the video frames should be encoded as intra-coded frames. In particular, the control signal 209 may relate to how the rate at which the video frames should be encoded as intra-coded frames should change with time. The rate may correspond to a length of a GOP structure applied by the video encoder 206. The control signal 209 may hence include information about how the video encoder 206 should change the length of the GOP structure over time. Alternatively, or additionally, the information sent to the video encoder 206 in the control signal 209 may directly indicate whether a specific video frame should be intra-coded or inter-coded.

The control component 304 makes the selection between intra-coding and inter-coding such that the video camera 204 moves at most the predetermined distance between capturing video frames which are intra-coded. This is further illustrated in FIG. 4. The time points $t_0$, $t_1$, $t_2$, $t_3$, $t_4$, $t_5$ etc. correspond to at least some of the time points when the camera 204 captured a video frame. For time points $t_0$, $t_1$, $t_2$, $t_3$, $t_4$, $t_5$ etc. the video camera 204 makes a selection whether or not to intra-code a frame. The control component 304 may make the selection for each video frame in the video sequence 205. In that case, time points $t_0$, $t_1$, $t_2$, $t_3$, $t_4$, $t_5$ etc. correspond to consecutive frames of the video sequence 205, and the time points $t_0$, $t_1$, $t_2$, $t_3$, $t_4$, $t_5$ etc. are hence set in accordance with the frame rate of the video sequence 205.

However, since in most applications the moving object 102 cannot possibly move the predetermined distance between two frames of the video sequence 205, it is not necessary for the control component 304 to make the selection for each frame. For example, if a maximum possible velocity of the moving object 102 is known, the shortest time in which the camera 204 can move the predetermined distance may be calculated. The control component 304 may then set the rate at which it makes the selection such that the temporal distance between time points $t_0$, $t_1$, $t_2$, $t_3$, $t_4$, $t_5$ etc. when the selection is made is equal to or less than the calculated shortest time.

Figure 4:
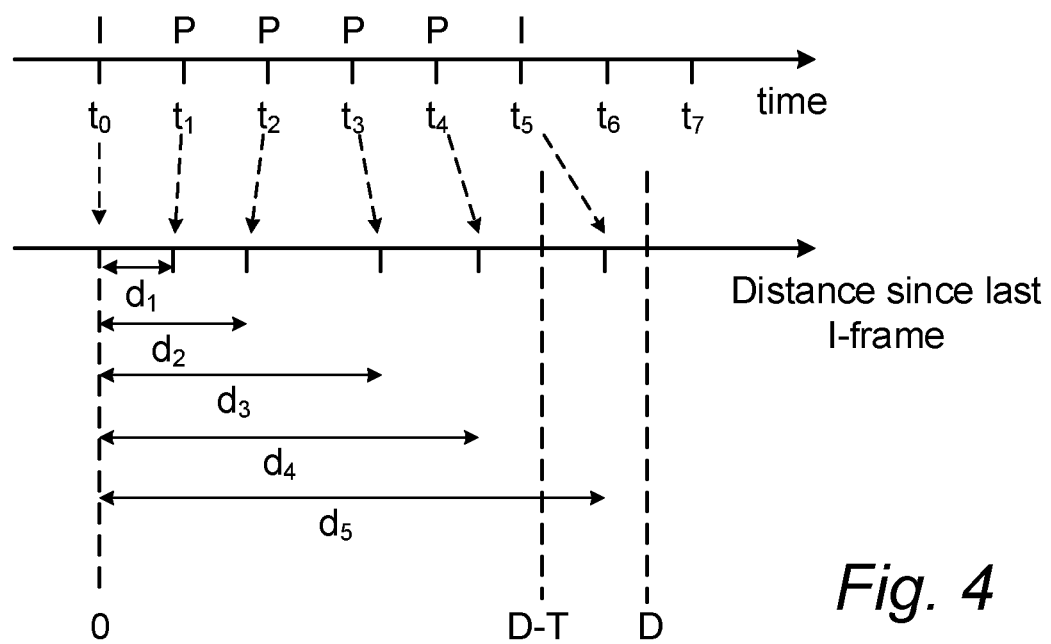
FIG. 4 schematically illustrates a process of selecting between infra-coding and inter-coding of video frames of a video sequence according to a first group of embodiments.

In the example of FIG. 4, a frame is intra-coded at time $t_0$, as indicated by the letter I (I for I-frame). At time $t_0$, the distance travelled by the camera 304 since the last intra-coded frame is thus equal to zero. At time $t_1$, the control component 304 may calculate based on the input 212 indicating an amount of movement of the camera, a distance that the camera 204 has moved since time $t_0$ when the camera 204 last captured a video frame which was intra-coded.

For this purpose, the control component 304 may calculate based on the input 212 indicating an amount of movement of the camera, a distance $d_1$ that the camera 204 has moved since it last captured a video frame which was intra-coded. For example, if the input 212 is a velocity of the camera 204, the control component 304 may integrate the velocity from time $t_0$ until time $t_1$ to calculate the distance $d_1$. If the input 212 instead provides positional data, the distance $d_1$ may, for instance, be calculated as the position at time $t_1$ minus the position at time $t_0$. The control component 304 may then compare the calculated distance $d_1$ to the predetermined distance D in order to select whether to intra-code or inter-code the frame captured at time $t_1$.

In order to make sure that the camera 204 does not move more than the predetermined distance D between capturing video frames which are intra-coded, the control component 304 may compare the calculated distance $d_1$ since the last intra-coded frame to the predetermined distance D minus a threshold value T. If the calculated distance $d_1$ is further than the threshold value T from the predetermined distance D, that is, if $d_1 < D - T$, then the frame at time $t_1$ is selected to be inter-coded. Otherwise, the frame at time $t_1$ is selected to be intra-coded. In the illustrated example, $d_1 < D - T$ and hence the frame at time $t_1$ is selected to be inter-coded as indicated by the letter P (P for P-frame). This procedure is then repeated at time points $t_2$, $t_3$, $t_4$, and $t_5$. In the example, the calculated distances $d_2$, $d_3$, $d_4$ corresponding to time points $t_2$, $t_3$, $t_4$ are still less than D−T, and hence the frames captured at these points in time are selected to be inter-coded. However, the distance $d_5$ calculated at time point $t_5$ is larger than D−T, and hence the frame at time $t_5$ is selected to be intra-coded. The control component 304 informs the video encoder 206 of the selection via the control signal 209. The control component 304 then continues for subsequent time points $t_6$, $t_7$ etc. to calculate distances moved by the camera 204 since it last, at time $t_5$, captured an intra-coded frame.

The control component 304 may set the threshold value T so as to minimize the risk of the distance travelled by the camera 204 between intra-coded frames being larger than the predetermined distance D. For this purpose, the control component 304 may predict the distance travelled by the camera 204 between the current point in time and the next point in time when an intra-coding/inter-coding selection will be made. The prediction may use the input 212 regarding the amount of movement of the camera 204. For instance, at time $t_1$, the control component 304 may predict the distance $d_2 - d_1$ based on the input 212. For instance, if the input 212 includes a current velocity of the camera 204 at time $t_1$, the control component 304 may predict the distance $d_2 - d_1$ as a product of the current velocity and the time $t_2 - t_1$ until the next selection is to be made. However, it is understood that more advanced predictions may be made, such as predictions which also take the acceleration of the camera 204 into account. Having predicted the distance that will be travelled by the camera 204 until the next intra-coding/inter-coding selection is made, the control component 304 may set the threshold T to be equal to or larger than the predicted distance. With this approach, the threshold T may hence vary with time. In a simpler approach, the threshold T may be fixed and correspond to a product of a predefined maximum velocity of the moving object and the period at which the selection step is repeated by the control component 304.

According to an alternative group of embodiments, illustrated in FIG. 5, the control component 304 waits with making a selection between intra-coding/inter-coding regarding a frame captured at a first point in time until a second, later point in time. For example, the control component 304 may wait until time $t_5$ before making a selection regarding the frame captured at time $t_4$. In this way, the control component 304 may make the selection regarding a first point in time by also taking the amount of movement of the camera between the first point in time and the second point in time into account. Accordingly, at a second point in time, the control component 304 may calculate based on input 212 a distance that the camera has moved since capturing the last frame that was intra-coded. If the distance is equal to or larger than the predetermined distance, the control component 304 selects to intra-code the frame at the first time point. If the distance is less than the predetermined distance, the control component 304 selects to inter-code the frame at the first time point.

Figure 5:
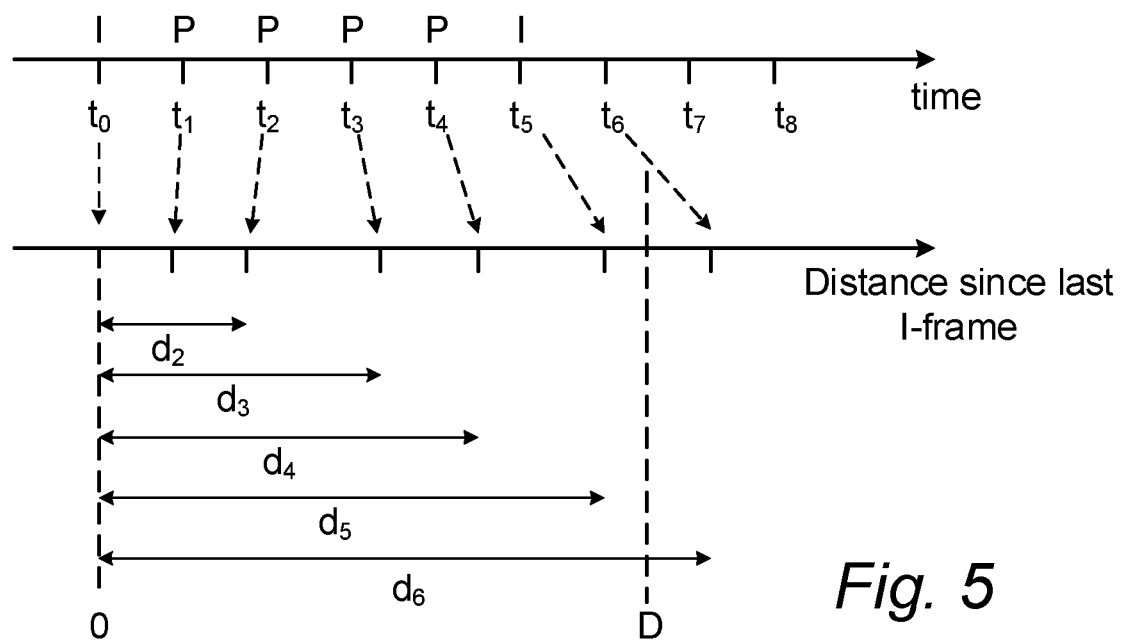
FIG. 5 schematically illustrates a process of selecting between infra-coding and inter-coding of video frames of a video sequence according to a second group of embodiments.
Figure 6:
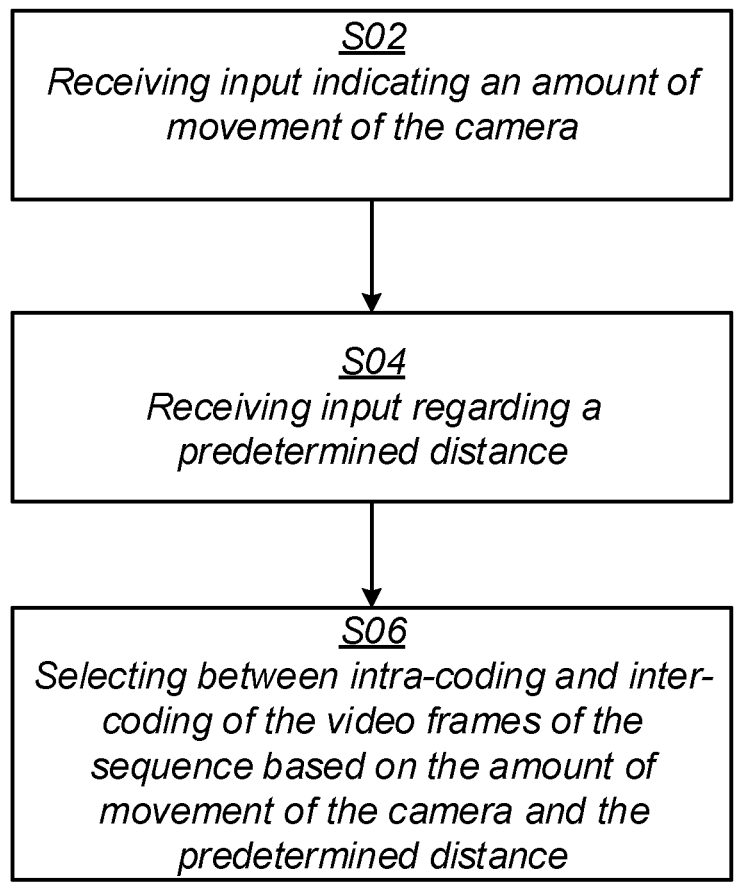
FIG. 6 is a flowchart of a method for controlling a video encoder to encode a sequence of video frames captured by a camera mounted to a moving object according to embodiments.

Turning to FIG. 5, at time $t_2$, the control component 304 calculates from the input 212 a distance $d_2$ moved by the camera 204 since it at time $t_0$ last captured an intra-coded frame. Since $d_2$ is less than the predetermined distance D, the control component 304 decides at time point $t_2$ that the frame captured at time point $t_1$ should be inter-coded. Similarly, the control component 304 decides at time points $t_3$, $t_4$ and $t_5$ that the frames captured at time points $t_2$, $t_3$, and $t_4$, respectively, should be inter-coded since the corresponding distances $d_3$, $d_4$, and $d_5$ are all less than the predetermined distance D. At time point to, the control component 304 will however reach a different decision since the corresponding distance $d_6$ moved by camera 204 since the last captured intra-coded frame is larger than the predetermined distance D. Accordingly, the control component 304 will at time point $t_6$ select that the frame captured at time point $t_5$ should be intra-coded. The control component 304 informs the video encoder 206 of the selection via the control signal 209. The control component 304 then continues for subsequent time points $t_7$, $t_8$ etc. to calculate distances moved by the camera 204 since it last, at time $t_5$, captured an intra-coded frame. The embodiment of FIG. 5 is advantageous over the embodiment of FIG. 4 in that the risk of the camera 204 moving more than the predetermined distance between capturing two frames which are intra-coded is eliminated. However, this advantage is achieved at the cost of introducing a latency in the encoding.

Upon receipt of the control signal 209, video encoder 206 may encode image data of the frames of the video sequence 205 according to the selection made by the controller 208.

In that way, at least one frame will be intra-coded while the camera moves the predetermined distance. The video encoder 206 may further have reason to intra-code frames more often (but not more seldom) than signalled by the controller 208 via the control signal 209. In order to make sure that the controller 208 is aware of which frames have been intra-coded, the video encoder 206 may send feedback 211 to the controller 208. The feedback 211 may in particular indicate to the controller 208 the frame in the video sequence 205 that was last intra-coded. The control component 304 may use that information when calculating distances $d_1$, $d_2$, $d_3$ etc. moved by the camera 204 as explained above.

In some cases, the video camera 204 stores the encoded sequence of video frames 207 locally in a video storage. Alternatively, the encoded sequence of video frames 207 may be stored in a video storage which is remote from the video camera 204. The video storage may be any suitable form of non-volatile memory. The video storage may have a limited capacity. The limited video storage capacity should typically last for a predetermined time, such as a day. The predetermined distance affects the size of the encoded sequence of video frames 207. A lower predetermined distance causes more frames to be intra-coded, thus requiring more storage space, compared to a higher predetermined distance.

In order to avoid that the video camera 204 runs out of memory for storing the encoded sequence of video frames 207, the controller 208 may adjust the predetermined distance in real time. In more detail, the controller 208 may include a distance adjustment component 306 which adjusts the predetermined distance, and forwards the adjusted predetermined distance to the control component 304. Generally, the distance adjustment component 306 may adjust the predetermined distance based on a current usage of the video storage capacity and/or the amount of movement of the object. For example, if the remaining video storage is lower than a first reference level, the distance adjustment component 306 may increase the predetermined distance and vice versa. Also, if the current amount of movement of the camera 204 is higher than a second reference level while the remaining video storage is lower than a first reference level, the distance adjustment component 306 may increase the predetermined distance.

The distance adjustment component 306 may adjust the predetermined distance within a pre-set range. The range may be set depending on the video storage capacity in the video camera 204, typically in combination with a movement pattern of the moving object 102. The movement pattern may be derived from historical data reflecting how the moving object 102 historically has moved during a time period corresponding to the predetermined time when the camera system 100 is to be used. The movement pattern may for example be represented in terms of a histogram of the velocity of the moving object 102 during the time period. For example, a lower end of the range may be higher for a first moving object 102 than for a second moving object, if the first moving object 102 moves more on average than the second moving object. Specifically, the range may be set based on a combination of the video storage capacity in the video camera 205 and the movement pattern of the moving object 102. For the same video storage capacity in the video camera 205, the lower end of the range may be set to be lower for an object having a lower average velocity based on the historical data compared to an object having a higher average velocity based on the historical data.

It will be appreciated that a person skilled in the art can modify the above-described embodiments in many ways and still use the advantages of the present teachings as shown in the embodiments above. For example, in the above examples it is described to estimate the distance of travel from the last frame that was intra-coded. However, it would also be possible to base the decision between inter-coding and intra-coding completely on the current motion vector read from the motion measurement device (e.g., from an accelerometer). This will not be as precise, but may still be good enough in a practical implementation. Thus, the present teachings should not be limited to the shown embodiments but should only be defined by the appended claims. Additionally, as the skilled person understands, the shown embodiments may be combined.

What is claimed is:

1. A method of encoding a sequence of video frames captured at a fixed temporal frame rate by a camera mounted to a moving object comprising:
   receiving input indicating an amount of movement of the camera;
   receiving input regarding a predetermined spatial distance; and
   selecting between intra-coding and inter-coding of the video frames of the sequence based on the amount of movement of the camera and the predetermined spatial distance, such that the camera moves at most the predetermined spatial distance between capturing video frames which are intra-coded,
   wherein the selecting between intra-coding and inter-coding of the video frames of the sequence includes:
      calculating, based on the input indicating an amount of movement of the camera, a distance that the camera has moved since it last captured a video frame which was intra-coded; and
      selecting between intra-coding and inter-coding of a current or a previous video frame based on a comparison between the calculated distance and the predetermined spatial distance,
   wherein the current video frame is selected to be intra-coded if the calculated distance is closer than a threshold value to the predetermined spatial distance, and
   wherein the current video frame is selected to be inter-coded if the calculated distance is further than the threshold value from the predetermined spatial distance.

2. The method of claim 1, wherein the selecting between intra-coding and inter-coding of the video frames of the sequence based on the amount of movement of the camera and the predetermined spatial distance includes setting a rate at which the video frames are encoded as intra-coded frames.

3. The method of claim 1, wherein the threshold value depends on at least one of the amount of movement of the camera and a rate at which the step of selecting between intra-coding and inter-coding of the video frames of the sequence based on the amount of movement of the camera and the predetermined spatial distance is repeated.

4. The method of claim 1, wherein the input indicating an amount of movement of the camera includes at least one of a velocity of the camera and a position of the camera at a specified time.

5. The method of claim 1, wherein the input indicating an amount of movement of the camera is received from one or more of an accelerometer, a gyroscope, or a positioning device included in the camera or worn by the moving object.

6. The method of claim 1, wherein the selecting between intra-coding and inter-coding of the video frames of the sequence based on the amount of movement of the camera and the predetermined spatial distance is repeated for each video frame in the sequence.

7. The method of claim 1, wherein the selecting between intra-coding and inter-coding of the video frames of the sequence based on the amount of movement of the camera and the predetermined spatial distance is repeated at a rate which is set depending on a maximum velocity of the moving object.

8. The method of claim 1, wherein the camera has a video storage capacity, and the method further comprises adjusting the predetermined spatial distance based on at least one of a current usage of the video storage capacity of the camera and the amount of movement of the camera.

9. The method of claim 8, wherein the predetermined spatial distance is adjusted within a range which is set depending on the video storage capacity in the camera and historical data reflecting a movement pattern of the moving object.

10. A controller for controlling a video encoder to encode a sequence of video frames captured at a fixed temporal frame rate by a camera mounted to a moving object, comprising:
a receiver configured to receive input indicating an amount of movement of the camera and input regarding a predetermined spatial distance; and
a control component configured to control the video encoder to select between intra-coding and inter-coding of the video frames of the sequence based on the amount of movement of the camera and the predetermined spatial distance, such that the camera moves at most the predetermined spatial distance between capturing video frames which are intra-coded, the control component, in order to control the video encoder to select between intra-coding and inter-coding of the video frame of the sequence, being further configured to:
calculate, based on the input indicating an amount of movement of the camera, a distance that the camera has moved since it last captured a video frame which was intra-coded; and
select between intra-coding and inter-coding of a current or a previous video frame based on a comparison between the calculated distance and the predetermined spatial distance,
wherein the current video frame is selected to be intra-coded if the calculated distance is closer than a threshold value to the predetermined spatial distance, and
wherein the current video frame is selected to be inter-coded if the calculated distance is further than the threshold value from the predetermined spatial distance.

11. A system comprising:
a video camera arranged to be mounted on a moving object and to capture a sequence of video frames at a fixed temporal frame rate;
a motion measurement device configured to measure an amount of movement of the video camera;
a video encoder for encoding the sequence of video frames captured at the fixed temporal frame rate by the video camera; and
a controller for controlling the video encoder to encode the sequence of video frames captured at the fixed temporal frame rate, comprising:
a receiver configured to receive input indicating an amount of movement of the video camera and input regarding a predetermined spatial distance; and
a control component configured to control the video encoder to select between intra-coding and inter-coding of the video frames of the sequence based on the amount of movement of the camera and the predetermined spatial distance, such that the video camera moves at most the predetermined spatial distance between capturing video frames which are intra-coded, the control component, in order to control the video encoder to select between intra-coding and inter-coding of the video frame of the sequence, being further configured to:
calculate, based on the input indicating an amount of movement of the camera, a distance that the camera has moved since it last captured a video frame which was intra-coded; and
select between intra-coding and inter-coding of a current or a previous video frame based on a comparison between the calculated distance and the predetermined spatial distance,
wherein the current video frame is selected to be intra-coded if the calculated distance is closer than a threshold value to the predetermined spatial distance, and
wherein the current video frame is selected to be inter-coded if the calculated distance is further than the threshold value from the predetermined spatial distance.

12. A non-transitory computer-readable storage medium including instructions, which when executed by a device having a processing capability, cause the device to execute instructions for encoding a sequence of video frames captured at a fixed temporal frame rate by a camera mounted to a moving object, the instructions causing the device to perform operations comprising:
receiving input indicating an amount of movement of the camera;
receiving input regarding a predetermined spatial distance; and
selecting between intra-coding and inter-coding of the video frames of the sequence based on the amount of movement of the camera and the predetermined spatial distance, such that the camera moves at most the predetermined spatial distance between capturing video frames which are intra-coded,
wherein the selecting between intra-coding and inter-coding of the video frames of the sequence includes:
calculating, based on the input indicating an amount of movement of the camera, a distance that the camera has moved since it last captured a video frame which was intra-coded; and
selecting between intra-coding and inter-coding of a current or a previous video frame based on a comparison between the calculated distance and the predetermined spatial distance,
wherein the current video frame is selected to be intra-coded if the calculated distance is closer than a threshold value to the predetermined spatial distance, and
wherein the current video frame is selected to be inter-coded if the calculated distance is further than the threshold value from the predetermined spatial distance.

* * * * *